United States Patent [19]

Williams et al.

[11] 4,235,940
[45] Nov. 25, 1980

[54] METHOD AND APPARATUS FOR RIDDLING BOTTLED WINES IN CASES

[75] Inventors: David W. Williams, Forestville; James L. Jordan, Guerneville; James E. Huntsinger, Windsor, all of Calif.

[73] Assignee: F. Korbel & Bros., Guerneville, Calif.

[21] Appl. No.: 890,305

[22] Filed: Mar. 27, 1978

[51] Int. Cl.$^3$ .............................................. C12G 2/00
[52] U.S. Cl. ................................ 426/592; 426/405; 99/277.2; 209/325; 209/329
[58] Field of Search ..................... 426/592, 405, 406; 209/325, 329; 99/277.2; 366/111, 128

[56] References Cited

U.S. PATENT DOCUMENTS

| | | | |
|---|---|---|---|
| 2,255,799 | 9/1941 | Meinzer | 366/111 |
| 3,066,026 | 11/1962 | Shaler et al. | 426/592 X |
| 3,533,602 | 10/1970 | Heck et al. | 99/277.2 X |

Primary Examiner—Arthur D. Kellogg
Attorney, Agent, or Firm—Schapp and Hatch

[57] ABSTRACT

The method of riddling wine contained in bottles packed in shipping cases in which the cases are inverted to allow solids to settle into the necks of the bottles, tilting the cases from side to side to jostle the bottles, and vibrating the cases and bottles contained therein, the jostling and vibrating of the bottles serving to dislodge solids in the wine from adherence to the bottles so that the solids settle onto a temporary cap at the outlet of the bottle for disgorging when the cap is removed. The cases of bottles are tilted and vibrated for periods from about ten minutes to about thirty minutes to dislodge solid particles from adherence to the bottle, and the tilting and vibrating is halted for periods from about one hour to about six hours until tilting and vibrating is again effected. The disclosed apparatus for riddling bottled wine includes a frame having a floating mounting and a motor driven eccentric weight carried on the frame for vibrating the frame and cases of bottles thereon, together with rows of inflatable air bags along the opposite sides of the frame for alternately lifting such sides and jostling the bottles within their compartments in the cases. A clock system controls the power supply to the vibrator motor and the air supply to the inflatable air bags, the clock system being adjustable for supplying electrical current to the vibrator motor at preselected times and for periods of predetermined duration, and for supplying air under pressure alternately to the air bags at one side or the other of the frame at selectively predetermined intervals and for periods of predetermined duration.

55 Claims, 8 Drawing Figures

METHOD AND APPARATUS FOR RIDDLING BOTTLED WINES IN CASES

This invention relates to improvements in the art of riddling wines such as champagne, and more particularly to riddling of bottled wines in cases.

In the making of fine wines, and particularly in the making of champagne which is fermented in the bottle, it is necessary to remove all suspended solids and sediment in order for the wine to have a sparkling, clear appearance. This sediment is the natural result of the fermentation process and includes yeast and other solid matter, often in the form of extremely fine particles which would impart a cloudy appearance if left in the wine. The process of removing such sediment from bottled wine has come to be known as "riddling".

The traditional method of accomplishing riddling involves manually grasping each bottle, pulling it part way out of a supporting rack, rotating the bottle approximately 90 degrees, and thereafter slamming the bottle back into the rack with sufficient force to cause the desired action. The purpose of riddling is to deposit all the yeast and other solids at the outlet of the bottle from whence they may be removed later. Removal of the accumulated sediment from the bottle is conventionally accomplished by freezing the neck of the bottle, removing the temporary crown cap, ejecting the frozen slug of wine containing the sediment and solids, and then corking the bottle.

Attempts have heretofore been made to utilize mechanical apparatus for accomplishing riddling of bottled wines. For example, U.S. Pat. No. 2,056,014 discloses a rack formed for spinning rows of bottles and tilting them from one side to the other. U.S. Pat. No. 3,533,602 discloses racks which eliminate the spinning of the bottles, these racks being adapted to tilt the bottles from side to side and to vibrate the rack and bottles thereon to accomplish riddling. These rack methods of riddling are considerably less labor intensive than the original hand method. However, the bottles still must be placed in temporary cartons for fermentation, then removed from the temporary cartons one by one and placed in position on the racks, then removed one by one from the racks when the riddling function has been accomplished and returned to the temporary cartons for transporting to the neck freezing and disgorging apparatus.

BRIEF SUMMARY OF THE INVENTION

The method and apparatus of the present invention eliminates a great part of the hand labor necessary with riddling racks for removing the bottles from the temporary cartons and placing them in the racks, and for removing the bottles from the racks after riddling and replacing them in the temporary cartons. The present invention accomplishes this desirable result by fermenting the bottled wines in compartmented packing cases, tilting the cases from side to side to jostle the bottles, and vibrating the entire cases of bottles, with the jostling and vibrating serving to free the solids from adherence to the inner surfaces of the neck of the bottle as they settle to the outlet.

This concept makes possible even greater savings of labor by loading the cases onto pallets, where they remain during the entire fermentation, aging and riddling processes. Thus, during riddling, entire pallet loads of cases of bottled wine are vibrated and are tilted from side to side to accomplish the desired jostling of the bottles in the cases.

Different types of wines, and even different batches of the same type of wine, have different characteristics with regard to particle size, specific gravity, coherence and adherence. The vibrating action and the jostling action must be such as to dislodge the settling particles from the downwardly constricting surface of the neck of the bottle so that the solids will settle onto the crown cap or other member at the outlet of the bottle for convenient disgorging of the sediment as by freezing in a slug of ice. At the same time, to accomplish the riddling action in the least possible time, it is desirable that neither the jostling action nor the vibrating action agitate the bottles sufficiently to stir the settled particles back into the main body of the wine. Accordingly, the number and frequency of the tiltings and the intensity and duration of the vibrating action are made adjustable for obtaining best results with the particular wine being riddled.

It is therefore an object of the present invention to provide a method for processing champagne and the like which is much less labor intensive than previous methods, with the bottles of the wine being contained in compartmented shipping cases during the fermentation, aging and riddling processes.

Another object of the invention is to provide a method of the character described wherein a plurality of cases of bottled wine are supported on a pallet, and the bottled wine in an entire pallet load of cases is allowed to ferment with the bottles in upright position, the pallet load of cases then being turned over to invert the bottles for aging, with the pallet load of cases then being periodically tilted from side to side and vibrated to jostle and vibrate the bottles and cause the solids in the wine to settle into the extreme end of the necks of the bottles.

Another object of the present invention is to provide a method of the character described in which tilting and vibrating periods of predetermined length alternate with rest periods of predetermined length.

A further object of the invention is to provide an apparatus for processing and clarifying champagne and the like in the bottle while the bottles are contained in compartmented cases.

Another object of the present invention is to provide an apparatus capable of supporting, tilting and vibrating a plurality of cases of bottles supported on a pallet.

Yet another object of the invention is to provide an apparatus of the character described in which the tilting and vibrating operations are accomplished automatically without human attention.

A still further object of the present invention is to provide an apparatus of the character described in which the frequency and duration of the tilting action and the duration of the vibratory action may be adjusted to provide optimum results with the particular wine undergoing riddling.

Further objects and features of advantage will become apparent from the following specification and the claims.

The method of the present invention includes the steps of tilting cases of inverted bottles of wine from side to side to jostle the bottles for dislodging solids in the wine from adherence to the bottles, and vibrating said cases and bottles contained therein so as to cause the solids to settle into the extreme end of the neck of each bottle.

Preferably, the bottles of wine are packed in compartmented shipping cases, where they remain during the entire fermentation, aging, settling, and riddling procedures. To carry this out, clarified wine is placed in bottles, together with yeast, sugar and bentonite, the bottles then being temporarily sealed with crown caps and placed in individual compartments in conventional shipping cartons or cases. The cases of bottles are then stacked on pallets with the bottles upright. The loaded pallets are maintained in this position (bottles upright) at a control temperature of about 65° to 70° Farenheit for a period of about two to six months, during which fermentation takes place.

At the end of the fermentation period, a second pallet is placed on top of the pallet load of cases, and the entire load is lifted and turned upside down, preferably by an inverting forklift, so that the bottles are standing on their crown caps. The inverted cases, now supported by the second pallet, are allowed to stand for from about six months to eighteen months. During this period, the wine ages and the major portion of solids in the wine settles down into the necks of the bottles. The bentonite is a colloidal mineral clay, the particles of which when dispersed through the wine have an affinity for yeast cells and other solids. Because of higher average specific gravity, the bentonite particles and the solids adhering thereto tend to sink more rapidly through the wine into the necks of the inverted bottles than would the solids alone. In this manner, approximately 95% to 98% of particles and suspended solids settle out into the neck during the aging and settling period.

The pallets and their cases of inverted bottles are then vibrated and tilted sharply from side to side. This tilting action jostles the bottles in their individual compartments. It should be noted that the diameter of the bottles is slightly less than the corresponding dimension of the individual shipping case compartment in which the bottle is contained, and the bottles are somewhat shorter than the height of the individual compartments. Thus, when the case is tilted quickly to one side, the bottle pivots on the crown cap resting against the end of the compartment and impacts against the wall of the compartment in the direction of incline. When the case is quickly tilted in the opposite direction, the bottle flops over against the opposite wall of the compartment. Although the clearance is comparatively small, about one-eighth inch, it is believed that the flip-flop action of the bottles in the compartments materially enhances the jostling effect.

The purpose of the jostling is to dislodge particles which may have settled onto the inwardly curving walls of the neck of the bottle from any adherence to the bottle so as to promote settling of such particles onto the crown cap or other device fitted across the mouth of the bottle. The described vibrating of the pallet and cases of bottles also serves to dislodge settled particles from the walls of the neck of the bottles and assist the particles to settle on the crown cap.

In carrying out the method of the invention, it has been found that the solids in some wines tend to adhere more firmly to the bottle. The method of the present invention therefore contemplates controlling the jostling and vibrating actions in accordance with the characteristics of the particular wine being riddled. It has been found that the jostling and vibrating actions should be intermittent, with periods of activity being separated by rest periods during which the solids can settle further down into the necks of the bottles. The duration of the periods of activity and the rest periods is controlled in accordance with the characteristics of the solids in the particular wines being riddled.

It also has been found that optimum riddling of most champagnes by the method of the present invention can be accomplished by providing active periods of from about ten minutes to about thirty minutes separated by rest periods of from about one hour to about six hours. A large number of cases of champagne have been riddled utilizing the method of the present invention in active periods of from fifteen minutes separated by inactive periods of about one hour and forty-five minutes, so that the entire cycle takes place during a two hour period of time.

When the bottled wine has been sufficiently clarified by the riddling process of the present invention, the necks of the inverted bottles are refrigerated to freeze a slug of ice in the neck containing the settled solid, the crown caps are removed so that the internal pressure of the gases in the bottles can eject the slugs of ice, and the bottles are corked. Under certain conditions it is preferred to place a small plastic cup in the mouth of the bottle before the crown cap is applied. When the bottle is inverted, this cup opens upwardly to receive the solids. This cup or "bidule" may then be discharged with its contained solids from the bottle when the crown cap is removed.

The apparatus of the present invention is designed to carry out the described method upon very large numbers of cases of bottles simultaneously and automatically. A preferred form of this apparatus is illustrated in the accompanying drawings, in which:

While only one preferred form of the invention is illustrated in the drawings, it will be apparent from the specification and claims that certain modifications may be made to the apparatus without departing from the spirit of the invention.

Referring to the drawings in detail, it will be seen that the apparatus of the present invention, for riddling bottled wine in cases includes a frame 11 formed for supporting one or more compartmented cases 12 containing bottles 13 of wine in an inverted neck down position, a floating mounting 14 for the frame 11, and means 16 for vibrating frame 11 and the cases 12 and bottles 13 thereon for dislodging solids 17 in the wine 18 from adherence to the bottles 13 whereby such solids may settle to the outlets of the bottles.

Means 19 also is provided for rapidly tilting the frame 11 and the cases of bottles thereon for jostling the bottles 13 so as to dislodge the solids 17 from adherence to the bottles whereby such solids may settle to the outlets of the bottles. The vibrating means 16 and tilting means 19 cooperate together to accomplish maximum riddling effect.

In accordance with the present invention, timing means 21 is provided; the timing means 21 being formed for selective intermittent operation of the vibrating means 16 and tilting means 19. Preferably, the timing means 21 is formed for automatically cycling the vibrating means 16 and tilting means 19 independently through active and passive periods of predetermined and adjustable duration. This permits the apparatus to be used with optimum effect on loads of various sizes, wines of different characteristics, different sizes of bottles, etc.

Figures 1, 2, 3:
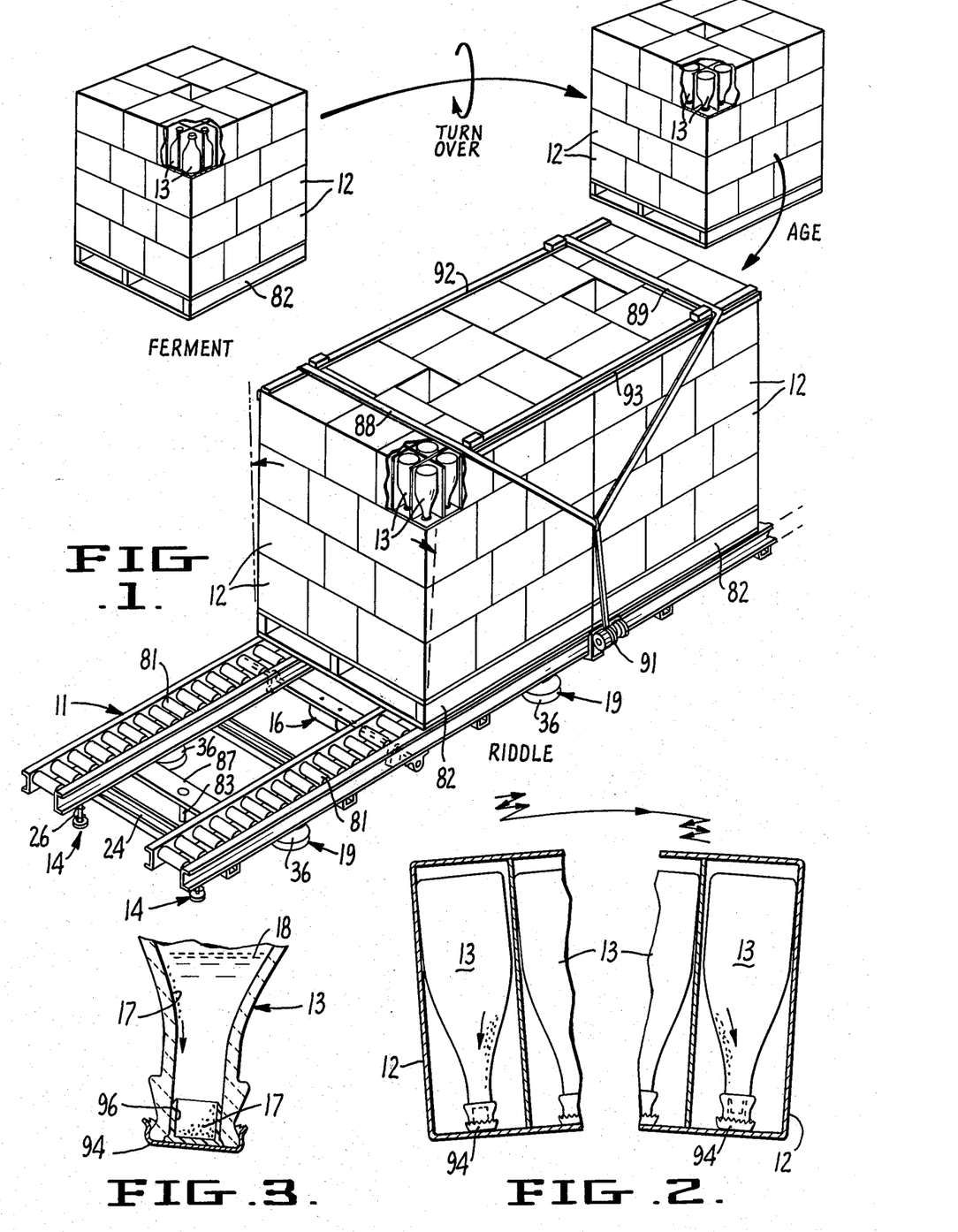
FIG. 1 is a perspective view of an apparatus for riddling bottled wine in cases constructed in accordance with the present invention and shown in operative association with several pallet loads of cases of bottled wines.
FIG. 2 is a fragmentary view on an enlarged scale of portions of the cases of bottles illustrating the tilting from side to side accomplished by the apparatus for accomplishing a desired jostling of the bottles.
FIG. 3 is an enlarged fragmentary cross sectional view of the neck portion of one of the bottles of FIG. 2 showing settling of solids from the bottled wine into a fitment at the mouth of the bottle.
Figure 5:
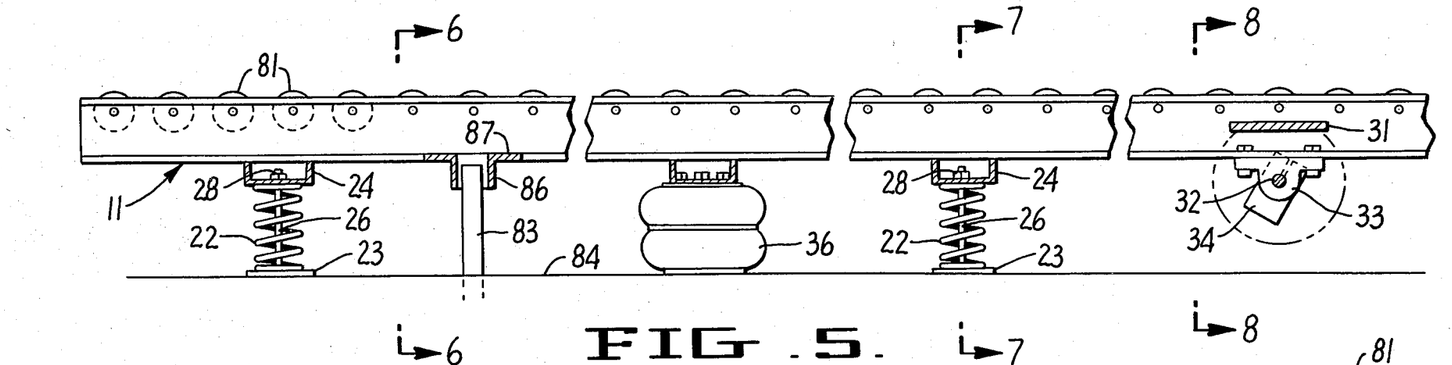
FIG. 5 is a fragmentary longitudinal sectional view, on an enlarged scale, of a portion of the apparatus, this view being taken substantially on the plane of line 5—5 of FIG. 4.
Figures 6, 7, 8:
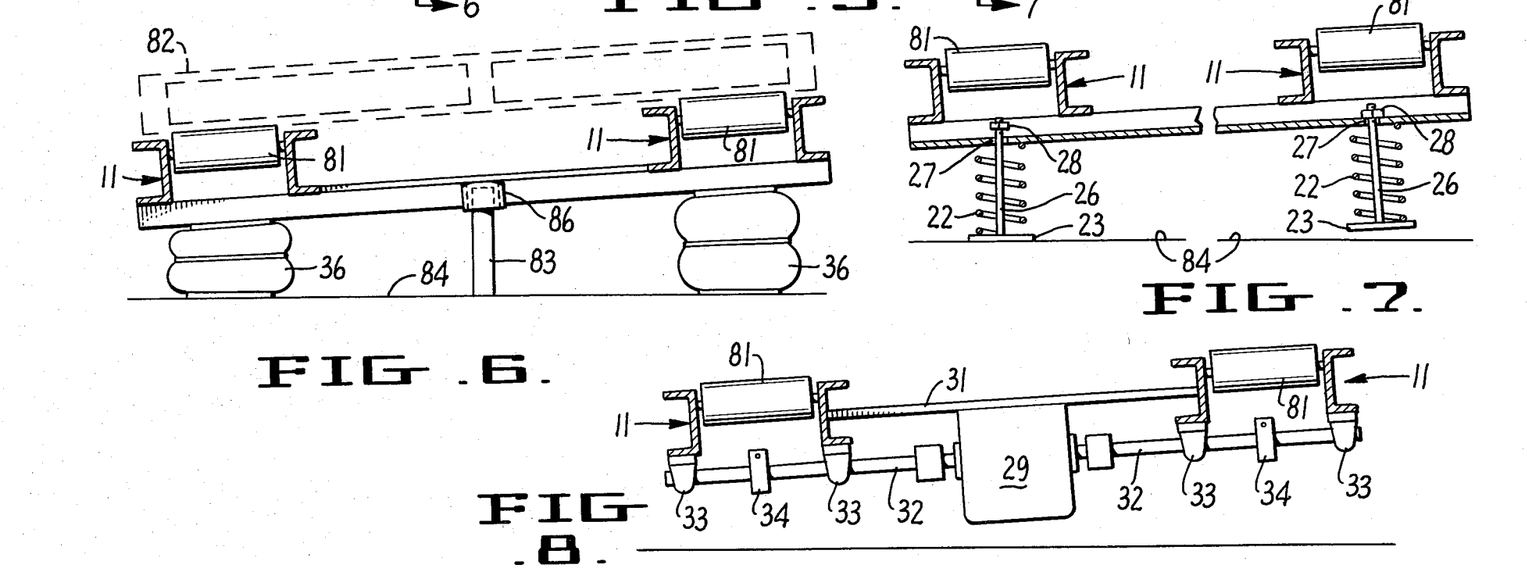
FIG. 6 is a transverse sectional view taken substantially on the plane of line 6—6 of FIG. 5.
FIG. 7 is a fragmentary transverse sectional view taken substantially on the plane of line 7—7 of FIG. 5.
FIG. 8 is a transverse sectional view taken substantially on the plane of line 8—8 of FIG. 5.

As shown in FIGS. 1, 5 and 7, the floating mounting 14 comprises a plurality of resilient supports formed for permitting freedom of tilting and freedom of vibration of the frame 11 and the load carried thereon. These resilient supports are here provided in the form of a plurality of helical compression springs 22 secured between floor engaging pads 23 and frame cross members 24 by means of a central bolt 26 secured to pad 23 and extending upwardly through an opening 27 in the frame cross member 24. A nut 28 on the upper end of bolt 26 holds the assembly together when pad 23 is lifted from the floor during tilting, see FIG. 7.

The means 16 for vibrating the frame 11 here includes an electric motor 29 mounted on a cross member 31 of frame 11 and formed for driving a shaft 32 journaled in bearings 33 secured to frame 11. A weight 34 is eccentrically secured to shaft 32 for joint rotation therewith. The speed of rotation of weight 34, and hence the periodicity of the vibration is governed by controlling the speed of drive motor 29. Also, the intensity of the vibration is adjustable by varying the mass and lever arm of each of the eccentric weights.

The means 19 for tilting the frame 11 preferably comprises axially expandable lifting members 36 arranged in pairs, with the members of a pair being mounted to exert lifting force on opposite sides of the frame 11. The tilting members are formed to permit vibration of the frame both in lifting mode and non-lifting mode.

Preferably, and as here shown, the tilting means 19 includes pairs of inflatable air bags 36, together with valve means 37 for selectively inflating and deflating the air bags to alternately lift opposite sides of frame 11 so as to cause desired back and forth tilting of the frame. Valve means 37 operates with sufficient rapidity for quick tilting of the frame 11 from one side to the other to accomplish the desired jostling action on the bottles 13 in their cases 12.

Figure 4:
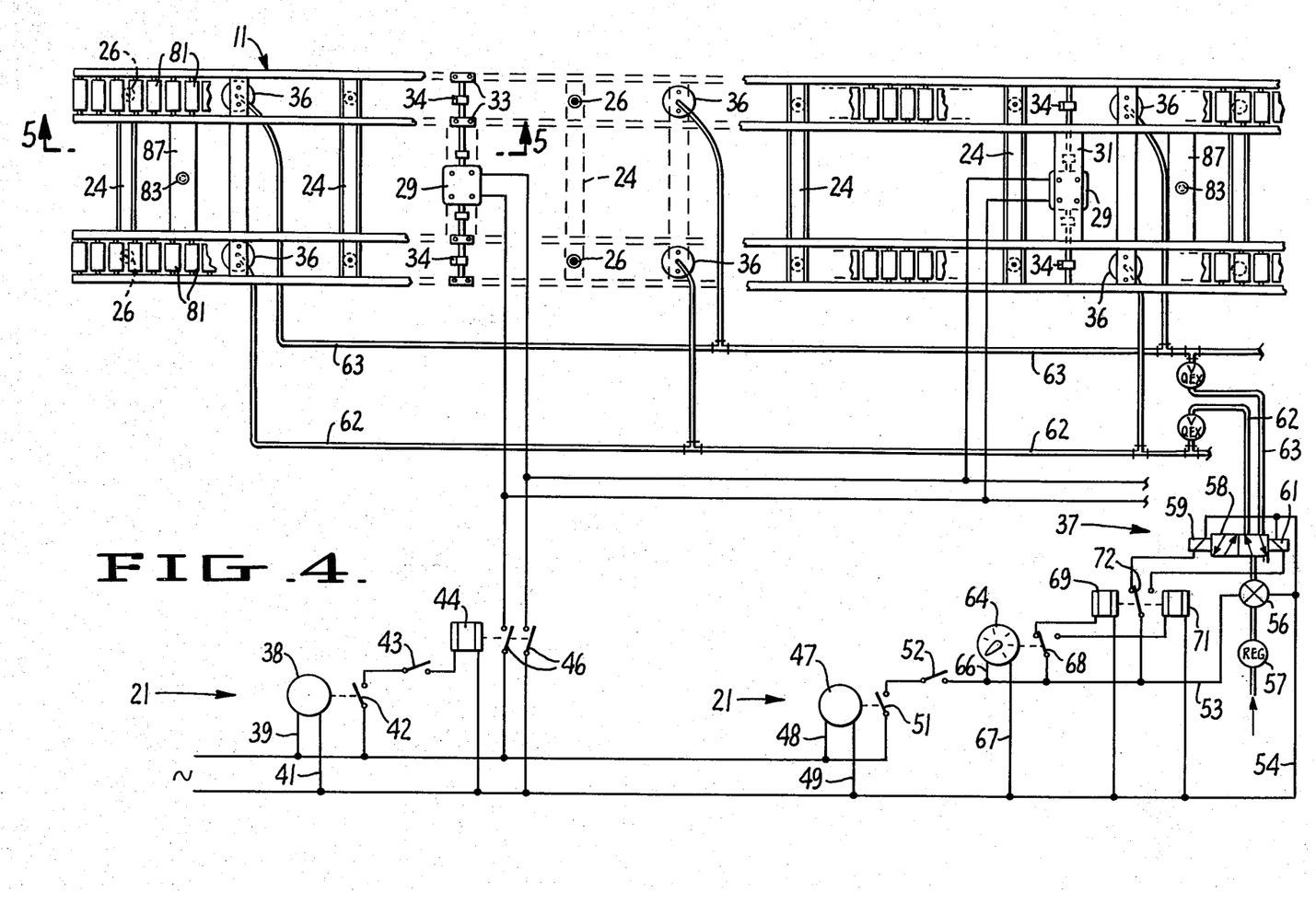
FIG. 4 is a schematic plan view of the apparatus of FIG. 1 with associated electrical and air supply controls shown diagrammatically.

As may best be seen in FIG. 4 of the drawings, the timing means 21 is formed for activating the vibrating means 16 and tilting means 19 at pre-selected times and for periods of desired duration. The vibrating means 16 here is controlled by a clock timer 38 connected by leads 39 and 41 to a suitable source of alternating current. The clock timer 38 may be programmed to close switch 42 at predetermined times and to open switch 42 after a desired interval. With disabling switch 43 closed, closing of switch 42 supplies electrical current to relay 44 which, when energized, closes switches 46 to supply electrical current to motors 29 and cause rotation of the eccentric weights 34.

A clock timer 47, similar to clock timer 38, is connected to a suitable source of alternating current by leads 48 and 49, clock timer 47 being formed for closing switch 51 at pre-selected times and reopening switch 51 after an interval of desired duration has elapsed. With disabling switch 52 closed, closing of switch 51 supplies current through leads 53 and 54 to open an air supply valve 56 connected through a pressure regulator 57 to a suitable source of air under pressure (not shown).

Upon opening of air supply valve 56, air under pressure is furnished to a "Vice-Versa" valve 58 actuated by solenoids 59 and 61 for alternately supplying air under pressure through conduits 62 and 63 to the air bags 36 on one side or the other of the frame 11. The row of air bags 39 being supplied air under pressure expand axially to lift their side of frame 11. At the same time, quick exhaust valves 60 in conduits 62 and 63 permit rapid deflation of the row of air bags not being supplied with air under pressure, permitting that side of frame 11 to lower as far as springs 22 permit.

Electrical power is supplied alternately to solenoids 59 and 61 by an adjustable interval flip-flop device 64 connected by leads 66 and 67 to a source of alternating current. Device 64 alternately supplies current to solenoids 59 and 61 of vice-versa air valve 58.

As a feature of the invention, the flip-flop device 64 may be preset to accomplish a desired number of back and forth tiltings of frame 11 during each active period. Thus, device 64 may comprise a time delay relay or similar device which supplies current through alternate leads at predetermined intervals. A suitable relay is depicted in FIG. 4 of the drawings, in which the device 64 moves switch 68 from one to the other of its terminal positions at desired timed intervals. Depending upon the position of switch 68, current is supplied to one or the other of relay coils 69 or 71, moving switch 72 to one of its terminal positions. This alternating action continues throughout each active cycle of the apparatus as determined by the clock controlled closing of switch 51.

The apparatus of the present invention is particularly capable of simultaneously riddling very large numbers of bottles of wine. The frame 11 is preferably elongated and equipped with conveyor rollers 81 capable of supporting conventional pallets 82 loaded with cases 12 of bottles 13 of wine to be riddled. As may be apparent from FIG. 4 of the drawings, the frame 11 may be as long as desired, and is equipped with rows of air bags 36 along each longitudinal side. Vibrating motors 29 are mounted at spaced intervals along the frame 11 and drive eccentric weights 34 positioned under the rollers 81. The springs 22 are also positioned at spaced intervals along frame 11 beneath the rollers 81. Restraint of the frame 11 against excessive lateral or longitudinal movement on its floating mountings is provided by posts 83 embedded in and projecting upwardly from the floor 84. Loosely fitting sleeves 86 encircle the upper ends of post 83 and are mounted on frame cross members 87. Because of the looseness of fit of sleeves 86 around posts 83, the vibration, tilting and vertical movement of frame 11 is not hampered, but excessive horizontal movement is constrained.

The pallet loads of cases of bottles are preferably tied down to the frame during the riddling operation. A suitable tie down device is illustrated in FIG. 1 of the drawings, wherein a pair of flexible bands 88 and 89 are passed over the tops of the loads of boxes on adjacent pallets 82 and are pulled tight by ratchet winch devices 91 mounted at opposite sides of the frame 11. The cartons 12 are protected against crushing by removable members 92 and 93.

As may be seen in FIG. 3 of the drawings, the riddling action of the apparatus causes the solid particles 17 to settle out of the wine onto the crown cap 94. Ordinarily, the solids 17 rest directly upon the crown cap until they are frozen into the plug of ice which is ejected when the crown cap is removed. It has been found that a small plastic cup 96, sometimes called a "bidule", may be inserted into the mouth of the bottle before the crown cap 94 is applied. The solids 17 will then settle into the bidule 96 and may be discharged from the bottle with the bidule when the crown cap is removed.

In view of the foregoing, it will be seen that the method and apparatus of the present invention provides extremely efficient automatic mechanical riddling of bottled wines by permitting the fermenting, aging and settling, and riddling operations to be carried out in an efficient and economical manner.

What is claimed is:

1. The method of riddling bottled wine packed in compartmented cases having individual compartments for each bottle separated by dividers, comprising
    inverting said cases and allowing solids to settle into the necks of said bottles,
    tilting said cases from side to side to jostle said bottles,
    and vibrating said cases and the bottles contained therein so as to cause the solids in the wine to settle into the lower end of the neck of each of said bottles.

2. The method as set forth in claim 1, and wherein said tilting and vibrating is continued for a predetermined length of time, said tilting and vibrating is halted for a predetermined length of time, and said tilting and vibrating is thereafter resumed.

3. The method as set forth in claim 2, and wherein said tilting and said vibrating occur during substantially the same periods of time.

4. The method as set forth in claim 2, and wherein said tilting of said cases from side to side to jostle said bottles occurs a plurality of times within each time period during which said cases and the bottles contained therein are being vibrated.

5. The method as set forth in claim 4, and wherein the length of the time period during which said cases and their bottles are vibrated is of sufficient duration to dislodge settled solids from adherence to the bottles but is short enough to avoid substantial stirring up of such solids into the wine.

6. The method as set forth in claim 5, and wherein the period of time said tilting and vibrating occurs is from about ten minutes to about thirty minutes, and the period of time said tilting and vibrating is halted is from about one hour to about six hours.

7. The method as set forth in claim 5, and wherein a plurality of said cases are secured to a pallet, and said pallet and cases are inverted, tilted and vibrated together.

8. The method of preparing bottle fermented wine, comprising
    admixing yeast, sugar and bentonite with an unclarified wine,
    placing said mixture in bottles,
    sealing said bottles with a temporary closure,
    placing said bottles in compartmented shipping cases,
    allowing said mixture of ferment in said bottles,
    turning said cases to a position wherein said bottles are neck down,
    allowing said cases to stand with the bottles in neck down position,
    periodically vibrating said cases and their contained bottles to dislodge solids in the wine from adherence to the bottles whereby said solids will settle at the outlet of the bottles,
    jostling said cases and bottles by rapid tilting from side to side,
    freezing the wine at the outlet of the bottles to provide a frozen plug containing the solids,
    unsealing said bottles and disgorging said frozen plug, and thereafter resealing said bottles.

9. The method as set forth in claim 8, and wherein said cases are tilted to one side, then after a period of time are rapidly tilted to the other side so as to jostle said bottles and further dislodge settled solids from adherence to the bottles.

10. The method as set forth in claim 9, and wherein said cases are tilted from side to side a plurality of times while said cases are being vibrated.

11. The method as set forth in claim 8, and wherein a plurality of said cases are mounted on a pallet, and said pallet and cases are subjected together to said fermenting, standing, vibrating and tilting steps.

12. The method as set forth in claim 11, and wherein said pallet is tilted from side to side to effect jostling of said bottles a plurality of times while said cases are being vibrated.

13. The method as set forth in claim 12, and wherein the intensity and duration of said vibrating is sufficient for dislodging settled solids from adherence to said bottles, but not for stirring such dislodged solids back into suspension throughout the wine.

14. The method as set forth in claim 13, and wherein the rapidity and degree of said tilting and jostling is sufficient for dislodging settled solids from adherence to said bottles, but not for stirring such dislodged solids back into suspension throughout the wine.

15. The method as set forth in claim 14, and wherein the active period of time said jostling and vibrating occurs is from about ten minutes to about thirty minutes, and the rest period of time said jostling and vibrating is halted is from about one hour to about six hours.

16. The method as set forth in claim 15, and wherein said active period is about fifteen minutes and said rest period is about one hundred five minutes.

17. An apparatus for riddling wine, comprising
    a frame formed for supporting a compartmented case containing bottles of wine in an inverted neck down position,
    a floating mounting for said frame,
    and means for repeatedly tilting said frame and said case and bottles thereon for dislodging solids in the wine from adherence to said bottles whereby such solids settle to the outlets of the bottles.

18. An apparatus as described in claim 17, and wherein timing means is provided, said timing means being formed for selective intermittent operation of said tilting means.

19. An apparatus as described in claim 18, and wherein said timing means is formed for automatically cycling said tilting means through active and passive periods of predetermined and adjustable duration.

20. An apparatus as described in claim 17 and wherein means is provided for vibrating said frame and said case and bottles thereon, and said frame is carried on a plurality of resilient supports formed for permitting freedom of tilting and freedom of vibration.

21. An apparatus as described in claim 20, and wherein said resilient supports are helical compression springs.

22. An apparatus as described in claim 20, and wherein said means for vibrating said frame comprises
   a motor mounted on said frame,
   a shaft journaled on said frame, and connected to said motor for rotation thereby,
   and an eccentric secured to said shaft for joint rotation.

23. An apparatus as described in claim 17, and wherein said means for tilting said frame comprises paired axially expandable lifting members, with the members of a pair being mounted to exert lifting force on opposite sides of said frame.

24. An apparatus as described in claim 23, and wherein said tilting members are formed to permit vibration of said frame both in lifting mode and non-lifting mode.

25. An apparatus as described in claim 24, and wherein said tilting means comprises paired air bags and means for selectively inflating and deflating said air bags so as to cause desired back and forth tilting of said frame.

26. An apparatus as described in claim 25, and wherein said means for inflating and deflating said air bags operates with sufficient rapidity to accomplish a desired jostling action on the bottles as said frame is tilted from side to side.

27. An apparatus for riddling wine, comprising
   a frame formed for supporting a compartmented case containing bottles of wine in an inverted neck down position,
   a floating mounting for said frame,
   means for vibrating said frame and said case and bottles thereon for dislodging solids in the wine from adherence to said bottles whereby such solids settle to the outlets of the bottles,
   means for tilting said frame for jostling said bottles so as to dislodge said solids from adherence to said bottles whereby such solids settle to the outlets of the bottles,
   timing means connected to said vibrating said tilting means and formed for selective intermittent operation thereof,
   said timing means being formed for automatically cycling said vibrating and tilting means independently through active and passive periods of predetermined and adjustable duration,
   said means for vibrating said frame comprising
   a motor mounted on said frame,
   a shaft journaled on said frame and connected to said motor for rotation thereby, and
   an eccentric secured to said shaft for joint rotation,
   and wherein said timing means comprises a clock system for supplying electrical current to said motor at preselected times and for periods of predetermined duration.

28. An apparatus as described in claim 27, and wherein said timing means further comprises a clock and air valve system for alternately supplying air under pressure to air bags at one side of said frame and air bags as the opposite side of said frame at selectively predetermined intervals and for periods of predetermined duration.

29. An apparatus for riddling wines fermented in the bottle and packed in compartmented shipping cases, comprising
   an elongated frame having rows of conveyor rollers formed for supporting a plurality of pallets loaded with cases of bottles in inverted neck down position,
   a plurality of resilient supports formed for floatingly supporting said frame and pallets of cases thereon,
   a plurality of motor driven eccentric weights journaled on said frame at spaced intervals,
   a plurality of inflatable air bags mounted along each longitudinal side of said frame and formed for lifting the associated side of said frame a desired distance when inflated so as to tilt the pallets of cases from side to side,
   switch means adapted for connection to a source of electrical current and formed for selectively energizing said motor,
   valve means adapted for connection to a source of air under pressure and formed for alternately inflating and deflating said air bags along the longitudinal sides of said frame,
   a clock timing system operating said switch means for supplying electrical current to said motor at preselected times and for periods of predetermined duration,
   and a second clock timing system operating said valve means for alternately inflating and deflating said air bags at the longitudinal sides of said frame at seletively predetermined intervals and for periods of predetermined duration.

30. The method of riddling bottled wine, comprising packing groups of bottles in compartmented cases,
   stacking said cases in groups of cases for fermentation,
   inverting said groups of cases so that the bottles therein are in neck down position and allowing solids in the wine to settle into the necks of said bottles, and
   repeatedly tilting said groups of cases and the bottles contained therein so as to cause said solids to settle into the lower end of the neck of each of said bottles.

31. The method as set forth in claim 30, and wherein said groups of cases are also vibrated.

32. The method as set forth in claim 31, and wherein said tilting and vibrating is continued for a predetermined length of time, said tilting and vibrating is halted for a predetermined length of time, and said tilting and vibrating is thereafter resumed.

33. The method as set forth in claim 32, and wherein said tilting and said vibrating occur during substantially the same periods of time.

34. The method as set forth in claim 30, and wherein said cases are stacked in said groups on pallets, and a second pallet is placed on top of each group before said inverting step whereby each group is palletized in both the initial position and inverted position of said bottles.

35. The method as set forth in claim 32, and wherein said tilting of said cases occurs a plurality of times within each time period during which said cases and the bottles contained therein are being vibrated.

36. The method as set forth in claim 35, and wherein the length of the time period during which said cases and their bottles are vibrated is of sufficient duration to dislodge settled solids from adherence to the bottles but is short enough to avoid substantial stirring up of such solids into the wine.

37. The method as set forth in claim 36, and wherein the period of time said tilting and vibrating occurs is from about ten minutes to about thirty minutes, and the period of time said tilting and vibrating is halted is from about one hour to about six hours.

38. An apparatus for riddling wine, comprising
frame means formed for supporting a group of stacked compartmented cases having an inverted bottle of unclarified fermented wine in each compartment,
and tilting means on said frame means formed for imparting repeated tilting action to said frame means and to said stacked cases and bottles of wine supported thereon for dislodging solids in the wine from adherence to said bottles whereby such solids settle to the outlets of said bottles.

39. The method as set forth in claim 38, and wherein means is provided for vibrating said bottles in their individual compartments for further dislodging said solids from adherence to said bottles and facilitating settling of such solids to the outlets of said bottles.

40. The method as set forth in claim 39, and wherein timing means is provided, said timing means being formed for selective intermittent operation of said tilting means.

41. The method as set forth in claim 40, and wherein said timing means is formed for automatically cycling said tilting means through active and passive periods of predetermined and adjustable duration.

42. The method as set forth in claim 38, and wherein said vibrating means vibrates said frame and said case and bottles thereon, and said frame is carried on a plurality of resilient supports formed for permitting freedom of tilting and freedom of vibration.

43. The method as set forth in claim 42, and wherein said resilient supports are helical compression springs.

44. The method as set forth in claim 43, and wherein said means for tilting said frame comprises paired axially expandable lifting members, with the members of a pair being mounted to exert lifting force on opposite sides of said frame.

45. The method as set forth in claim 44, and wherein said tilting means are formed to permit vibration of said frame both in lifting mode and non-lifting mode.

46. The method as set forth in claim 45, and wherein said tilting means comprises paired air bags and means for selectively inflating and deflating said air bags so as to cause desired back and forth tilting of said frame.

47. The method set forth in claim 46, and wherein said means for inflating and deflating said air bags operates with sufficient rapidity to accomplish a desired jostling action on the bottles as said frame is tilted from side to side.

48. The method as set forth in claim 42, and wherein said means for vibrating said frame comprises:
a motor mounted on said frame,
a shaft journaled on said frame, and connected to said motor for rotation thereby,
and an eccentric secured to said shaft for joint rotation.

49. An apparatus for riddling wine, comprising
a frame formed for supporting a group of stacked compartmented cases containing bottles of wine in an inverted neck down position in individual compartments,
a floating mounting for said frame,
means for vibrating said frame and said groups of cases and the bottles therein for dislodging solids in the wine from adherence to said bottles whereby such solids settle to the outlets of the bottles,
means for tilting said frame for jostling said bottles in said compartments so as to dislodge said solids from adherence to said bottles whereby such solids settle to the outlets of the bottles,
timing means connected to said vibrating and tilting means and formed for selective intermittent operation thereof,
said timing means being formed for automatically cycling said vibrating and tilting means independently through active and passive periods of predetermined and adjustable duration,
said means for vibrating said frame comprising
a motor mounted on said frame,
a shaft journaled on said frame and connected to said motor for rotation thereby, and
an eccentric secured to said shaft for joint rotation,
and wherein said timing means comprises a clock system for supplying electrical current to said motor at preselected times and for periods of predetermined duration.

50. An apparatus as described in claim 49, and wherein said tilting means further comprises a clock and air valve system for alternately supplying air under pressure to air bags at one side of said frame and air bags at the opposite side of said frame at selectively predetermined intervals and for periods of predetermined duration.

51. An apparatus for riddling wine, comprising
frame means formed for supporting a group of stacked compartmented cases having an inverted bottle of unclarified fermented wine in each compartment,
and tilting means connected to said frame means for repeatedly tilting said frame means and thus jostling said bottles from side to side in their individual compartments so as to dislodge solids in said wine from adherence to said bottles whereby such solids settle to the outlets of the bottles.

52. An apparatus as described in claim 51, and wherein additional means is provided for vibrating said frame and said group of stacked cases thereon.

53. An apparatus for fermenting and riddling wine comprising
a shipping type case having individual compartments for receiving bottles of fermented wine,
frame means formed for removably supporting said case with the bottles therein in inverted neck down position,
and means for tilting said bottles from side to side in their said compartments for dislodging solids in the wine from adherence to said bottles so as to cause such solids to settle to the outlets of the bottles.

54. An apparatus as described in claim 53, further comprising means for vibrating said frame means and said case.

55. An apparatus for fermenting and riddling wine comprising a shipping type case having individual compartments for receiving bottles of fermented wine, frame means formed for removably supporting said case with the bottles therein in inverted neck down position, and means for repeatedly tilting said frame means and case and bottles thereon for dislodging solids in the wine from adherence to said bottles so as to cause such solids to settle to the outlets of the bottles.

* * * * *